April 9, 1968  O. G. H. JUNGNER  3,376,751
SPEED CONTROLLED SUCTION TUBE FOR AUTOMATICALLY
REPEATED SUCTIONS
Filed July 29, 1965
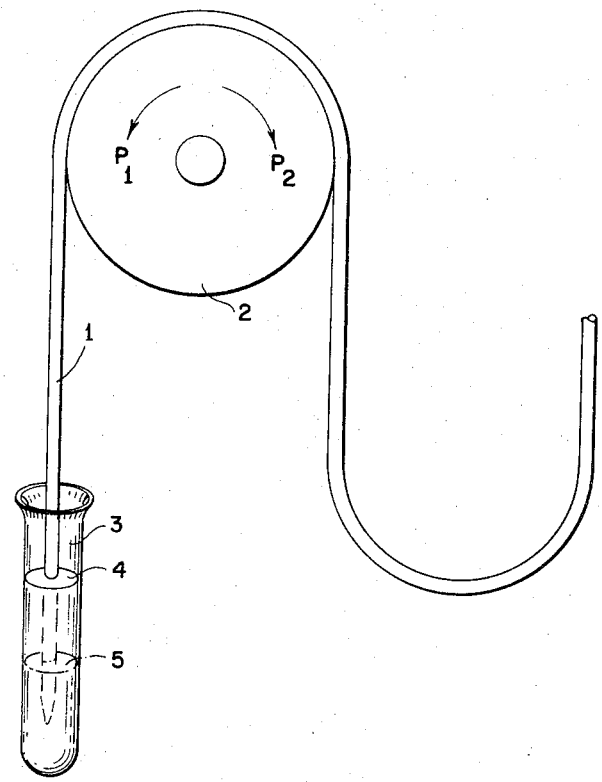
INVENTOR
OLOF G. H. JUNGNER
BY *Larson and Taylor*
ATTORNEYS

United States Patent Office 3,376,751
Patented Apr. 9, 1968

3,376,751
SPEED CONTROLLED SUCTION TUBE FOR AUTOMATICALLY REPEATED SUCTIONS
Olof Gunnar Hugo Jungner, Hovas, Sweden, assignor to Medicinsk-Kemiska Automationslaboratoriet AB-Mekalab, Stockholm, Sweden, a company
Filed July 29, 1965, Ser. No. 475,692
Claims priority, application Sweden, July 31, 1964, 9,336/64
4 Claims. (Cl. 73—423)

ABSTRACT OF THE DISCLOSURE

An apparatus consisting of horizontal drum and a flexible plastic suction pipe supported by the upper periphery of the drum is used for removing samples of uniform size from test tubes containing varying amounts of liquid. The drum is moved to-and-fro and the free end portion of the pipe hanging vertically from the drum in axial alignment with the test tube is alternately immersed into and lifted out of the liquid, each time thereby removing a liquid sample.

---

This invention concerns a speed controlled suction tube, which can be used, for example, for automatically repeated suctionings during chemical production and laboratory processes as well as medical laboratory tests and other analyses, in which a certain quantity of liquid is repeatedly suctioned off from one or more test tubes or the like fed forward under the suction tube, in order, for instance, to be conveyed forward in a suction pipe. In this manner a series of liquid samples at a certain internal distance from each other are obtained in the pipe, and during their conveyance in the pipe through controlled valves can in a controlled manner receive the addition of reagent liquids and individually be collected after the reactions have been brought to an end, for further treatment. In this manner the possibility is afforded of taking samples in a continuous series in the same pipe without the different samples affecting each other internally.

It is therefore necessary in such cases to make the repeated suctionings from the same or different test tubes volume controlled, so that each liquid sample has exactly the same volume. It has been attempted to automate this part of laboratory work by moving the tube down into and up out of the liquid in the test tube with the help of a controlled driving arrangement. However, one cannot work with a valve controlled suction in the tube, but in order not to complicate the apparatus, it must be connected to the suction pump during the whole cycle of movement. This means in turn that the amount of liquid which is sucked out of a test tube or likewise is dependent upon the path which the tube takes during the immersion and lifting out of the sample liquid, i.e. of the level of liquid in the test tube.

It could be considered possible to make the tube's downward path dependent upon the amount of liquid which has already been suctioned out of the test tube, that is to immerse the suction pipe lower and lower for each suctioning in the tube as the level drops. This leads, however, to a complicated design.

According to the present invention the movement of the suction pipe is allowed to be of the same magnitude the whole time and, having regard to the fact that the suction pump is connected to the suction pipe the whole time, and the previously mentioned undesirable dependence on the level of liquid is effected by means of increasing the speed of immersion and lifting of the pipe so much that the variations in the effective suction time dependent upon the varying level of liquid can be ignored.

Tests made by the inventor to increase the speed of immersion and lifting the pipe have, however, shown that the manner in which the movement of the pipe is controlled is also of very great importance. The speed cannot be increased indiscriminately without a shock action on the liquid arising from the immersion movement of the pipe—a splashing which affects the measurement result undesirably. A movement of the suction pipe induced by an elector magnet, or a falling movement, can therefore not be entertained nor a movement controlled by guides. The inventor has, however, found—and this forms an important development of the above named invention—that an exceptionally favourable possibility exists in moving the suction pipe or pipes up or down by means of a pulley or drum which rotates backwards and forwards in a swinging movement. The pipes are made, for example, of plastic and the diameter of the drum is chosen to be suitable of affording the desired evenness of movement. The suction volume is then dependent on both suction power and suction time but within certain tolerances independent of the level of liquid.

The above named arrangement and movement of the pipe is intended to simulate for example the gliding movement of a reptile into water. The invention will now be more closely described with reference to the accompanying drawing.

The drawing shows an outline diagram of the arrangement according to the invention, and for the sake of clarity neither the driving arrangement for the drum for moving the pipe or pipes up and down nor the suction pump has been shown.

The suction pipe 1 in the the depicted form is thought of as consisting of a thin pliable and flexible tube, suitably of plastic, which is conveyed in a gentle curve over a driving drum 2, in which by means of a reversible motor, not shown on the drawing, a swinging movement can be induced backwards and forwards in the manner suggested by the arrows P1 and P2. The pipe is in the position on the drum as shown in the drawing with its end submerged in a test tube 3 which is filled with a test liquid to a level 4. After several suctionings have occurred the level is presumed to have sunk to a level 5 shown on the drawing by a dotted line. The tube is carried over the drum 2 in a curve which is large in proportion to the diameter of the tube and forms a loop, possibly weighted, hanging down on the other side of the drum, and then carried up towards the suction pipe.

The circumference of the drum is suitably tracked for taking up the pipe or pipes and is also possibly roughened up or covered with some material to increase friction, such as rubber or likewise.

According to the invention the path which a point on the periphery of the drum travels is the same the whole time, but the difference in the effective suction time induced by the difference in level between levels 4 and 5 is reduced so much by increasing the speed of immersion and lifting of the pipe, that its effect on the volume of liquid suctioned off can be ignored.

Because the immersion into the liquid and the lifting from it occurs so quickly but still with controlled speed, the difference in levels in the liquid, within relatively wide tolerances, affect the total immersion time by such a small amount that they can be completely ignored. Admittedly, however, accuracy of measurement is reduced with too great a difference in level and it is therefore advisable to change the tubes containing the test liquid at sufficiently frequent intervals. This exchange should be carried out automatically and must naturally be synchronised with the movement of the driving drum.

It is possible that the time during which the suction pipe is stationary in the left, lowest, position for suctioning a determined volume of sample liquid, i.e. the stationary time of the motor in that position, as well as the suction power developed in the suction arrangement can be effected for the regulation of the volume of the suctioned-off liquid. The reversal of the rotary direction of the motor as well as its rotary speed can be effected by known means and by known methods. The drum or the axle of the drum can be fitted with end contacts which reverse polarity in the driving current to the motor and which, depending on the angle of turning of the drum, couple into the circuit arrangements for regulating the speed of the motor.

Although the invention has been described in conjunction with one more of execution it can nevertheless be varied within the scope of the following claims.

What I claim is:

1. An apparatus for removing liquid samples of substantially uniform size from test tubes containing varying amounts of liquid comprising a horizontal drum and a flexible plastic suction pipe supported by the upper periphery of the drum, the free end portion of the pipe hanging vertically from the drum in axial alignment with the test tube, so that when the drum is oscillated the free end of the suction pipe will move vertically into and out of said test tube, the outer end of the suction pipe being adapted to be connected to a suction pump.

2. A method for collecting liquid samples of substantially uniform size from test tubes containing varying amounts of liquid by means of a flexible plastic suction pipe which performs automatically repeated suctions, comprising the steps of connecting the suction pipe to a suction unit continuously during the whole cycle of collection, conveying said pipe over a horizontal drum whereby the pipe is supported by the upper periphery of the drum and the free end portion of the pipe hangs vertically from the drum, oscillating said drum to-and-fro to cause, through the frictional engagement of the pipe and drum, an up and down motion of the free end of said pipe at a constant rate independent of the liquid level in the test tubes, and moving said test tubes in a stepwise manner under the suction pipe for automatically repeated successive immersions of said pipe into said tubes to effect volume controlled suctions from said tubes, the volume of liquid sucked out of each test tube being made essentially independent of the liquid level in said tube by providing a high immersion and lifting speed of the suction pipe without any splashing effect on the liquid, the volume of the liquid sucked up being determined through control of the immersion time of the pipe.

3. A method according to claim 2 including the further step of regulating the speed of immersion of the liquid and the lifting of the pipe.

4. A method according to claim 2 including the further step of making the immersion speed of the pipe dependent on the turning angle of the drum.

References Cited

UNITED STATES PATENTS 3,127,773   4/1964   Blumenfeld ---------- 73—423

LOUIS R. PRINCE, *Primary Examiner.*

C. S. SWISHER, *Assistant Examiner.*